(12) United States Patent
Lumpkin (10) Patent No.: US 7,585,118 B1
(45) Date of Patent: Sep. 8, 2009

(54) FIBER OPTIC CABLE CONNECTOR AND ADAPTOR FOR OPTICAL LASER TRANSMITTER SYSTEM

(75) Inventor: Christopher F. Lumpkin, Steamboat Springs, CO (US)

(73) Assignee: Peregrine Surgical, Ltd., New Britain, PA (US)

( * ) Notice: Subject to any disclaimer, the term of this patent is extended or adjusted under 35 U.S.C. 154(b) by 8 days.

(21) Appl. No.: 12/148,349

(22) Filed: Apr. 18, 2008

(51) Int. Cl.
*G02B 6/36* (2006.01)
(52) U.S. Cl. .................. 385/88; 385/53; 385/92
(58) Field of Classification Search ............. 385/53, 385/88, 92; 439/577
See application file for complete search history.

(56) References Cited

U.S. PATENT DOCUMENTS

| | | | |
|---|---|---|---|
| 5,085,492 A | 2/1992 | Kelsoe et al. | 385/60 |
| 6,357,932 B1 | 3/2002 | Auld | 385/76 |
| 6,634,799 B2 | 10/2003 | Auld | 385/76 |
| 7,275,873 B2 * | 10/2007 | Auld | 385/58 |
| 2007/0239148 A1 | 10/2007 | Scheller | 606/15 |

* cited by examiner

*Primary Examiner*—Frank G Font
*Assistant Examiner*—Michael P Mooney
(74) *Attorney, Agent, or Firm*—Watov & Kipnes, P.C.; Kenneth Watov (57) ABSTRACT

The combination of an adaptor and a male connector are configured for screwing onto a female optical fiber connector consisting of electrically conductive material electrically connected to a sense node of a controller. A ground clip partially surrounds but is electrically isolated from the female connector. An adaptor consisting of an insulator ring having a first ring of electrically conductive material on a front face, a second ring of electrically conductive material on a back face, and a resistor mounted in a transverse groove of the insulator ring, with the resistor having its ends electrically connected between the first and second electrically conductive rings. The insulator includes a threaded centrally located hole for screwing onto the female connector, whereby the first ring is secured against the ground clip to ground the associated end of the resistor. A male connector having an electrically conductive housing is configured for carrying an optical fiber holder that plugs into a cylindrical cavity of the female connector when the male connector is screwed onto the female connector, with a front face of the male connector mechanically and electrically engaging the second ring to electrically connect the other end of the resistor to the female connector, whereby the controller responds by permitting activation of an associated laser transmitter to transmit laser light into an optical fiber carried by the optical fiber holder.

21 Claims, 12 Drawing Sheets

FIBER OPTIC CABLE CONNECTOR AND ADAPTOR FOR OPTICAL LASER TRANSMITTER SYSTEM

FIELD OF THE INVENTION

The present invention relates generally to optical transmitter systems, and more particularly to optical fiber connector configurations for such systems to permit a controller thereof to detect the presence of an acceptable fiber optic cable connected thereto, to initiate operation of the laser transmitter system to transmit laser light into an associated fiber optic cable.

BACKGROUND OF THE INVENTION

Optical laser transmitter systems, for reasons of safety, often include mechanisms for preventing operation of the system in the absence of a fiber optic cable being connected to the system, or in the event of an improper cable being connected to the system. In this manner, injury to operating personnel is substantially reduced, and the insurance of proper transmission of laser light from the system through an appropriate fiber optic cable for intended usage is enhanced.

SUMMARY OF THE INVENTION

An optical laser transmitter system includes a controller that has an electrical connection to an optical fiber female connector consisting of electrically conductive material. Ground clip means are electrically isolated from and surround the female connector for providing a connection to ground. A ring shaped adaptor consists of a centrally located insulator ring formed from electrically insulative material, and having a centrally located threaded hole for screwing the adaptor onto the female connector. First electrically conductive means secured to a front end or face of the insulator ring is tightened against the ground clip means by screwing the adaptor onto the female connector, for grounding one end of an electrical resistor electrically connected to the first electrically conductive means. The other end of the resistor is electrically connected to a second electrically conductive means secured to a back end or face of the insulator ring. When a male optical cable connector is screwed onto the female connector and tightened against the second electrically conductive means, third electrically conductive means are provided for electrically connecting the second electrically conductive means to the female connector, whereby the resistor is then electrically connected into a resistive voltage divider circuit of the controller. The controller includes means for sensing whether the resistor is of a predetermined value or within a range of values to permit operation of the optical laser transmitter system. If not, the controller will prevent activation or operation of the laser transmitter system. The male optical cable connector carries one end of an optical fiber cable, and further includes means therein for inserting an optical fiber carried by the cable into a cylindrical cavity of the female connector, in proper alignment therewith, for optimizing the transfer of a laser beam from the optical laser transmitter system to the optical fiber.

BRIEF DESCRIPTION OF THE DRAWINGS

Various embodiments of the present invention are described with reference to the drawings, in which like items are identified by the same reference designation, wherein.

DETAILED DESCRIPTION OF THE INVENTION

Figure 1A:
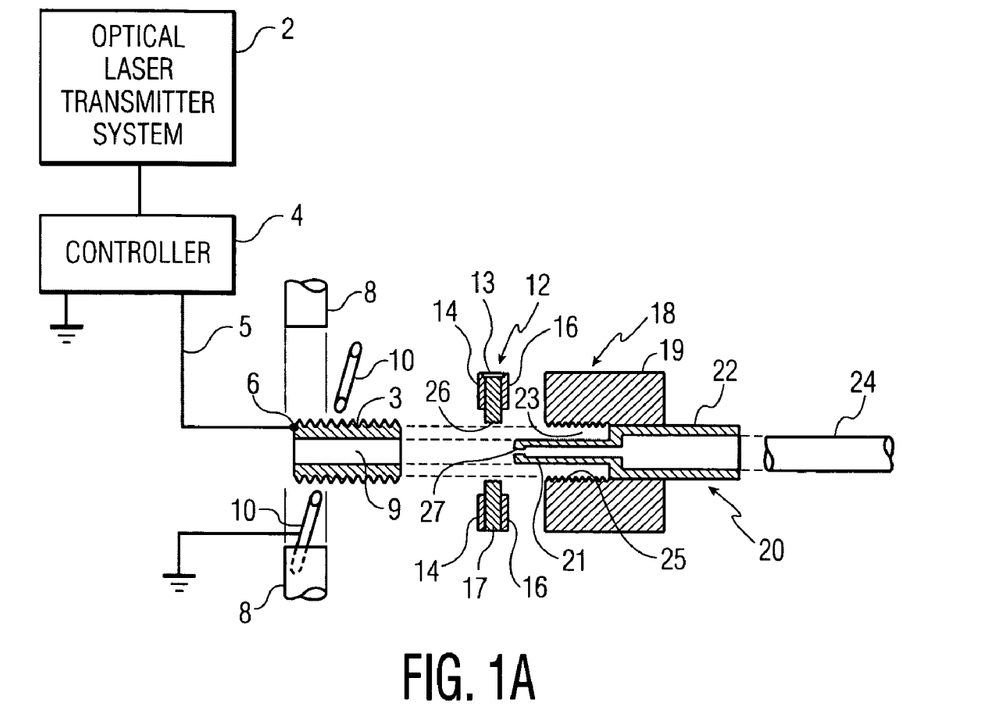
FIG. 1A is a generalized block and cutaway diagram showing one embodiment of the present invention.
Figure 1B:
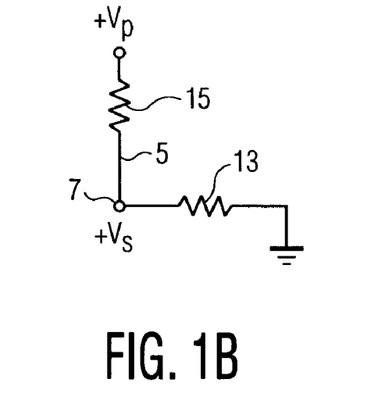
FIG. 1B is a circuit schematic diagram of a resistor voltage divider included in the controller of FIG. 1A.
Figure 2:
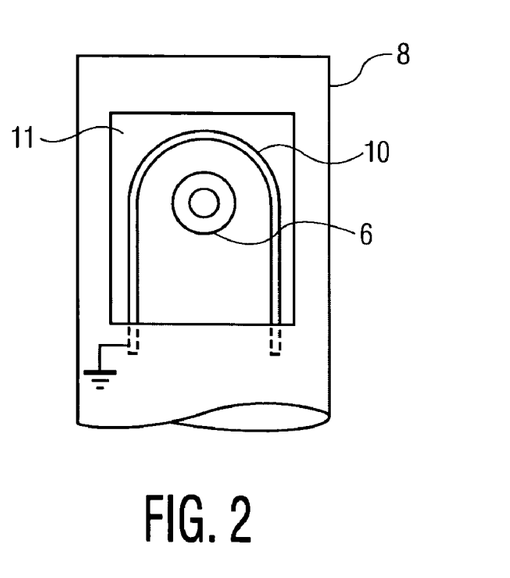
FIG. 2 is a front elevational view of a portion of the embodiment of the invention of FIG. 1A.

FIGS. 1A, 1B, and 2 show relatively generalized embodiments of the invention. More specifically, optical laser transmitter system 2 includes in association therewith a controller 4, and front panel assembly components which are shown in generalized form to include a printed circuit board 8 upon which are mounted within an opening 11 a female optical fiber connector 6, and a ground clip 10 in this example. The ground clip 10 is generally U-shaped, electrically isolated from the connector 6, and mounted at an angle with the latter, as shown in this example. The female optic fiber connector 6 consists of electrically conductive material, typically any suitable metal material, that includes threads 3 on its outer circumference. A ring configured adaptor 12 includes a centrally located electrically nonconductive insulator ring 17 sandwiched between a pair of opposing electrically conductive brass rings 14 and 16, in this example and embodiment. A resistor chip 13 is electrically connected between the brass rings 14 and 16, with the resistor chip 13 being held within a recessed channel in an edge or circumferential portion of the insulator ring 17, as shown.

In another embodiment, brass ring 16 is replaced by a spring biased electrically conductive switch plate or ring 138, spaced apart from a centrally located threaded nickel plated brass ring 131 as described below relative to FIGS. 8A through 8J, in the preferred embodiment. As shown in FIG. 1A, a male fiber optic connector 18 includes a cylindrical housing or shell 19 including a centrally located through hole or cylindrical cavity 23 having a threaded front portion 25, with the remainder being unthreaded. Cylindrical cavity 23 is configured also for receiving ferrule 20 that includes a reduced diameter front portion providing an optical fiber holder 21, and an enlarged cylindrical rear portion providing an optical fiber cable holder 22 for receiving an optical fiber cable 24 carrying or enclosing an optical fiber (not shown). During assembly, the optical fiber cable 24 has an outer sheathing cut back to provide for a front portion of the optical fiber to reside within the cylindrical cavity 23 of the optical fiber holder 21 of the ferrule 20. The front of the fiber holder 21 includes a centrally located small through hole for passing laser light from the optical laser transmitter system 2 into the optical fiber (not shown). Centrally located threads 26 of the adaptor 12 provide for screwing it on to the female connector 3 for securing the brass ring 14 against the ground clip 10 to insure good electrical connection therebetween, thereby grounding one end of resistor chip 13. Next, the male connector 18 is screwed onto the female connector 3 securely against the brass ring or washer 16 (or the switch plate or ring 138, not shown) for causing the other end of resistor 13 to be electrically connected through the electrically conductive material of the female connector 6 to a sensing node 7 for completing a resistive voltage divider contained within controller 4. More specifically, in FIG. 1B, the resistive voltage divider includes a resistor 15 connected between a source of DC voltage $+V_P$ to the sensing node 7, and further with the resistor chip 13 being connected between the sensing node 7 and ground, as previously described. The controller 4 includes means (not shown) for sensing the value of voltage at node 7, $+V_S$. If the sensed voltage $+V_S$ is in a predetermined voltage range, this confirms that the optical fiber of the interconnected optical fiber cable 24 is an acceptable fiber and that proper connection has been made to the laser transmitter system 2. Accordingly, sensing circuit means (now shown) of controller 4 permits activation of the optical laser transmitter system 2 for transmitting a laser lightbeam into optical fiber (not shown) of optical fiber cable 24. Note that typically the other end of the fiber optic cable 24 is connected to a laser probe (not shown), that may be of a design for use in ophthalmic surgery, for example. However, the invention is not limited to such use. Note that this embodiment, and other embodiments of the invention to be described, can, for example, be used for connecting an ophthalmic laser probe to a laser transmitter system as shown and described in U.S. Pat. No. 5,085,492, issued on Feb. 4, 1992. However, as previously indicated, the various embodiments of the present invention are not limited to such use. Note further that when the various embodiments of the present invention are used in association with the laser transmitter device as taught in the aforementioned patent, the optical fiber (not shown) of the fiber optic cable 24 typically has an outside diameter ranging from 0.003 inch to 0.010 inch, and the value of resistor chip 13 in this example typically is 6,190 ohms. However, the invention is not limited to this resistance value.

A male connector 48 assembly for a more specific first embodiment of the invention is shown in FIGS. 3A to 3E. As shown, this male connector assembly includes an optical fiber holder 28 consisting of a suitable metallic material for receiving a fiber optic cable 24 in a first portion 32, and optical fiber from the latter in a second portion 30, as shown. The second portion 32 includes a cutout slit 34 proximate its front end for receiving a retainer tube 36 that is crimped onto the second portion 32 of the optical fiber holder 28 to retain the cable 24 therein. In this embodiment, the connector shell 38 consists of a single piece of electrically conductive material, such as aluminum, or stainless steel. The shell 38 includes a cavity 40 for retaining a spring 42, with the spring also being mounted over the second portion 32 of the optical fiber holder 28. The shell 38 also includes a centrally located back through hole 44, and a centrally located threaded front through hole 46, as shown. As will be described in greater detail below, the assembled connector for this embodiment with the optical cable 24 secured within the first portion 30 of optical fiber holder 28. The spring 42 insures proper alignment of portion 30 of fiber holder 28 within a centrally located through hole 9 of the female connector 6. Note that the optical fiber holder 28 and retainer tube 36 in another embodiment of the invention can be provided via a single piece of appropriate material. This completes the assembled connector 48 for a first embodiment of the invention.

Figure 3A:
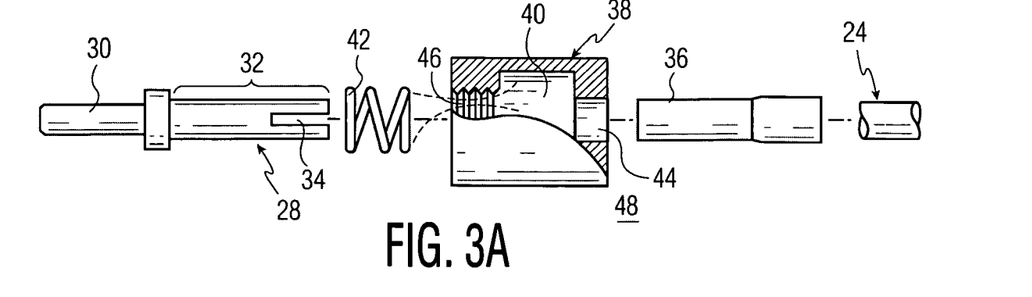
FIG. 3A is an exploded assembly diagram with a partial cutaway view of a connector shell showing a male fiber optic cable connector for one embodiment of the invention.
Figure 3B:
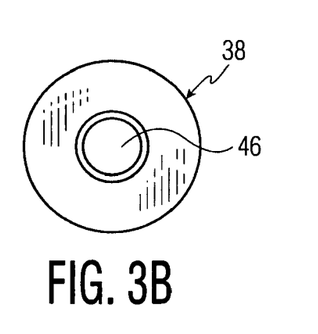
FIG. 3B is a front elevational view of the connector of 3A.
Figure 3C:
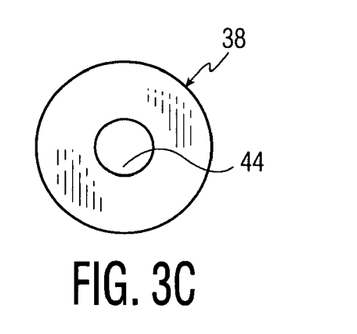
FIG. 3C is a back elevational view of the connector of FIG. 3A.
Figure 3D:
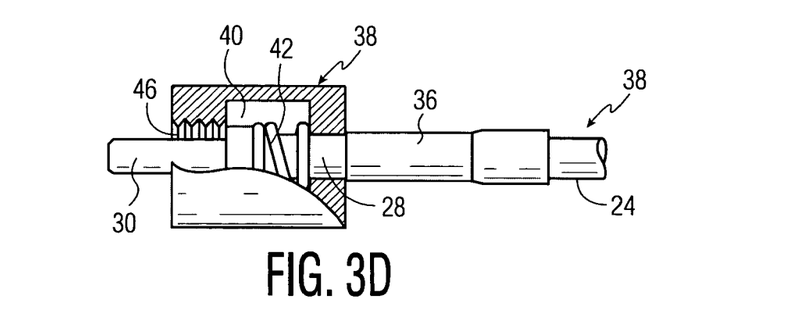
FIG. 3D is a cutaway view of the assembled connector of FIG. 3A.
Figure 3E:
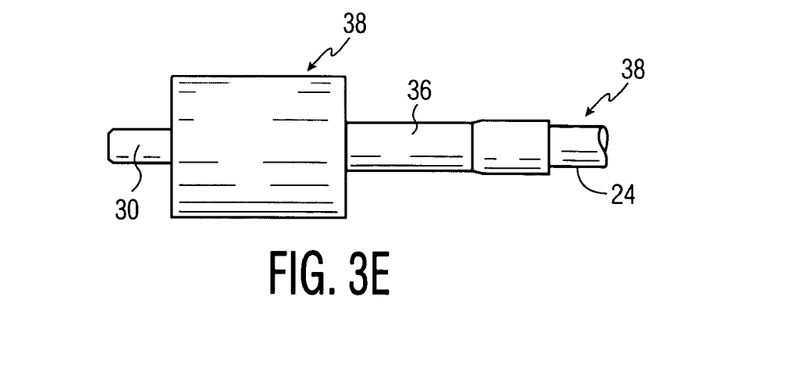
FIG. 3E is a pictorial view of the assembled connector of FIG. 3A.
Figure 4A:
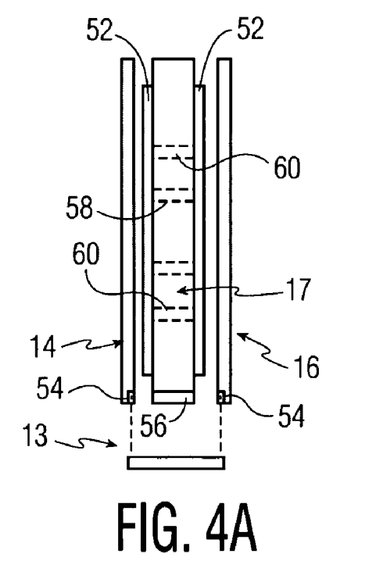
FIG. 4A is an exploded assembly view of an adaptor for one embodiment of the invention.
Figure 4B:
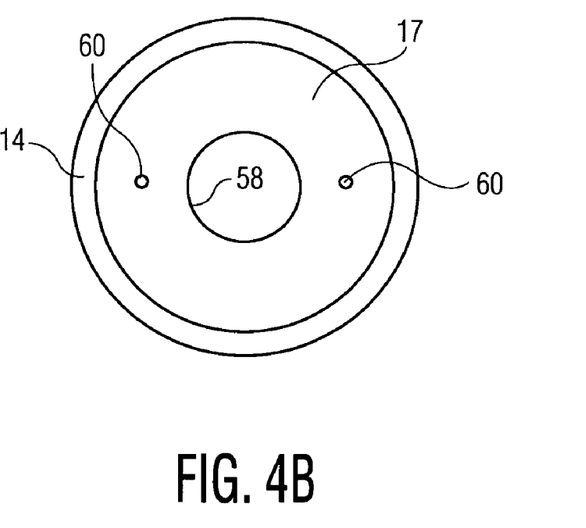
FIG. 4B is a front elevational view of the adaptor of FIG. 4A, the back view being a mirror image thereof.
Figure 4C:
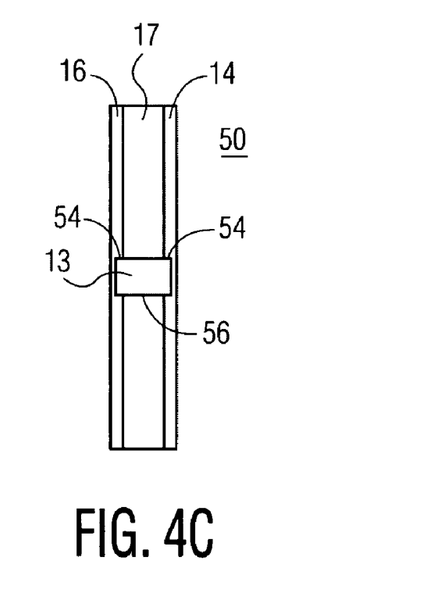
FIG. 4C is a side elevational view of the assembled adaptor of FIG. 4A.
Figure 4D:
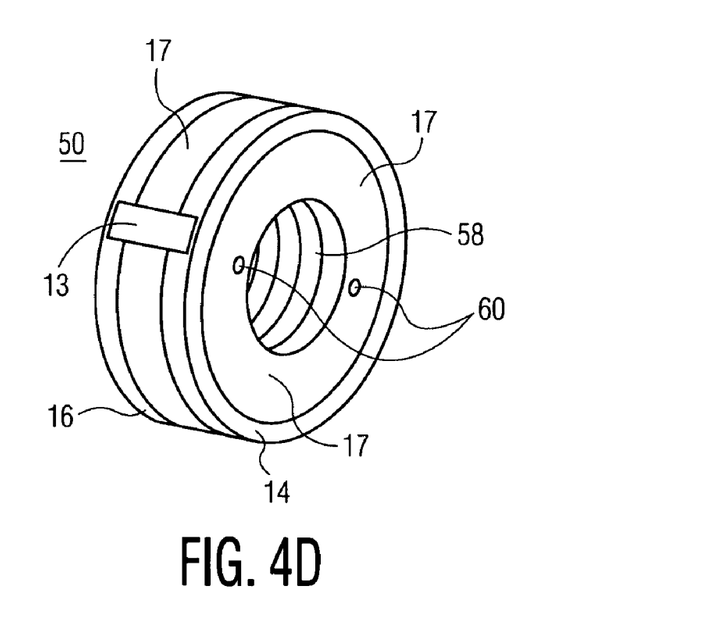
FIG. 4D is a pictorial view of the assembled adaptor of FIG. 4A.
Figure 5A:
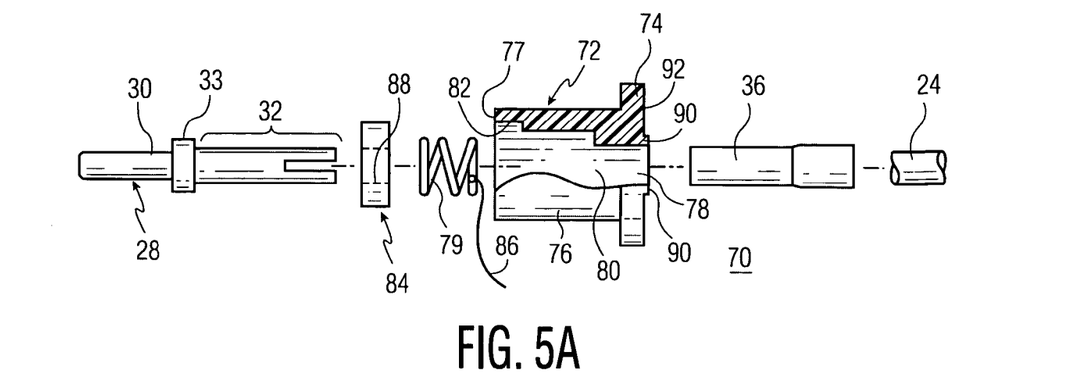
FIG. 5A is an exploded assembly diagram of a male connector for another embodiment of the invention.
Figure 5B:
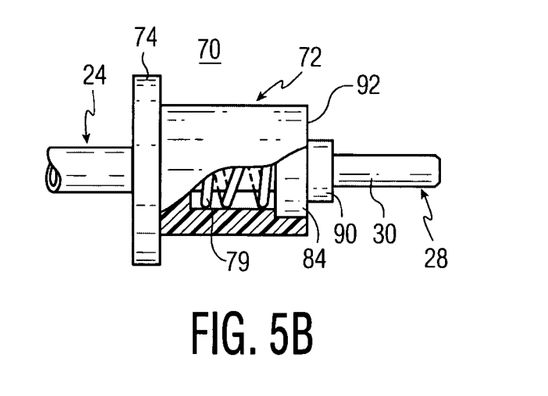
FIG. 5B is a side elevational view with a partial cutaway of the connector shell showing the assembled connector of FIG. 5A.
Figure 5C:
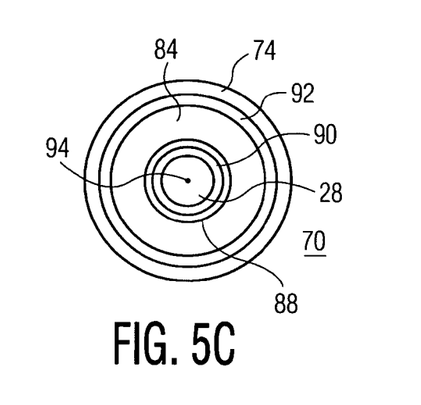
FIG. 5C is a front elevational view of the assembled connector of FIG. 5A.
Figure 5D:
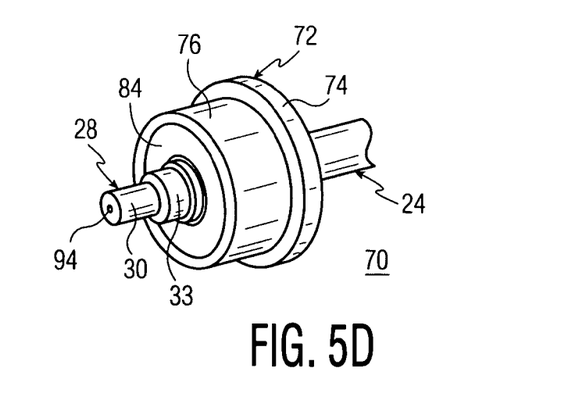
FIG. 5D is a pictorial view of the assembled connector of FIG. 5A.

Assembly of the male connector 48 will now be described with reference to FIG. 3A. First, the spring 42 is installed by pushing it through hole 46 into cavity 40 of connector shell 38. Next, an end portion of optical fiber cable 24 is stripped of its outer covering to expose a desired length of an optical fiber (not shown) and pushed through the back through hole 44 and front hole 46. The exposed optical fiber and a portion of the optical fiber cable 24 are pushed through the retainer tube 36. The optical fiber is then pushed into a hole in the center of the first portion 30 of optical fiber holder 28, with a substantial portion of the unstripped optical fiber cable 24 positioned in the second portion 32 optical fiber holder 28. The end of the optical fiber is also pushed out of a central hole through the end of the front portion 30 of optical fiber holder 28. The retainer tube 36 is then pushed with cable 24 onto the second portion 32 of optical fiber holder 28, and tube 36 is crimped to retain the optical fiber and associated optical cable 24 in the optical fiber holder 28. Excess optical fiber protruding from the face of optical fiber holder is cut off, and the face is lapped to obtain a desired finish to the end of the optical fiber. Note that the assembly sequence for other male connector embodiments is substantially similar.

Also included for this first embodiment of the invention is an adaptor 50 shown in FIGS. 4A through 4D. As shown, electrically nonconductive insulator ring 17 includes reduced diameter outwardly protruding step portions 52 on its front and back surfaces, for receiving and centering the brass rings 14, 16, respectively, in this example. An appropriate adhesive can be utilized for rigidly securing the brass rings 14, 16 to the insulator 17, which can be made of any suitable plastic or polymer material such as Delrin®, Teflon®, ABS polycarbonate, nylon, and so forth. Also, although brass is considered a preferred material for the rings 14 and 16, other materials can be used such as beryllium copper, gold, silver, and so forth, provided that the material is electrically conductive. Each of the brass rings 14 and 16 include small slots cut into a portion of the circumference thereof, for receiving the ends of a resistor chip 13 therebetween. Note that the brass rings 14 and 16 are identical, in this example. Also, the plastic ring 17 includes a small open transverse groove or slot 56 for receiving a portion of the resistor chip 13. In this example, the resistor 13 is installed into slot 56. Ends of the resistor chip 13 are respectively in electrical contact with and soldered to the brass rings 14 and 16, within slots 54, respectively. The plastic ring 17 further includes a centrally located threaded through hole 58, and two axially spaced apart relatively small diameter holes 60, for receiving a tool to be described below, for facilitating mounting of the adaptor 50 onto the optical fiber female connector 6 of the optical laser transmitter system 2.

Figure 10A:
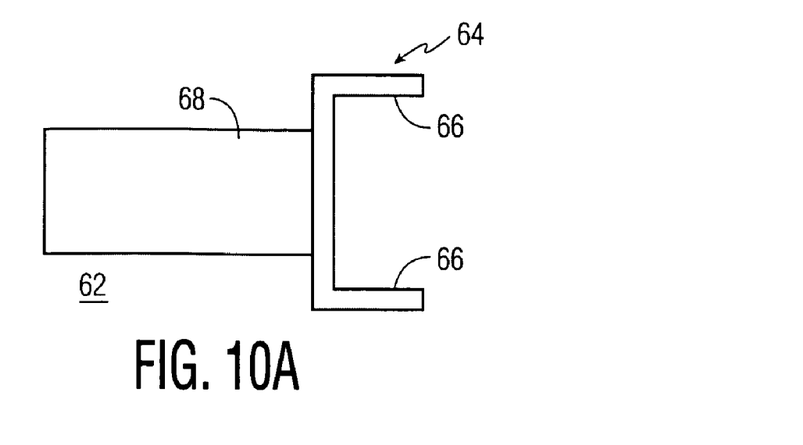
FIG. 10A is a top plan view of a tool for one embodiment of the invention.
Figure 10B:
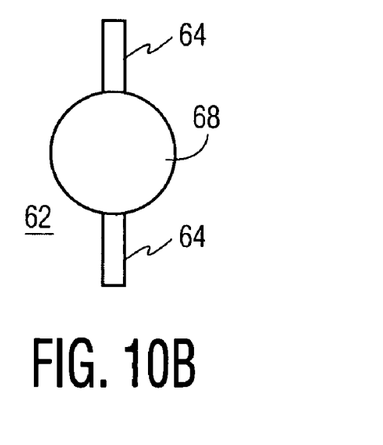
FIG. 10B is a back elevational view of the tool of FIG. 10A.
Figure 10C:
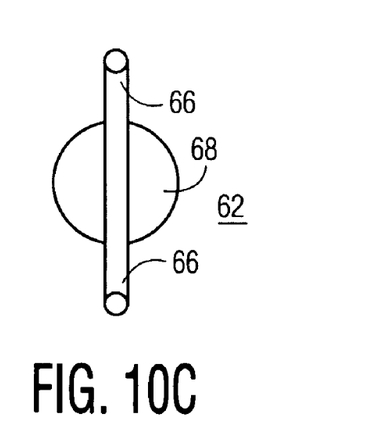
FIG. 10C is a front elevational view of the tool of FIG. 10A.

A tool 62 for facilitating the installation of the adaptor 50 to the female connector 6, and other adaptors of various embodiments of the invention described below, is shown in FIGS. 10A-10C. As shown, the tool 62 consists of a single piece of plastic material, such as Delrin®, or a suitable metal material, such as aluminum, or stainless steel, for example. The tool 62 includes at one end an outwardly projecting U-shaped portion 64 having two spaced apart circular fingers 66 dimensioned for fitting into the holes 60 of the adaptor 50, in this example. The tool 62 further includes a circular handle 68, as shown.

Operation of the first embodiment of the invention will now be described. The adaptor 50 is first screwed onto the female connector 6, preferably through use of the tool 62, or otherwise screwed on, to mechanically secure the brass ring 14 tightly against the ground clip 10, thereby insuring electrical contact therebetween. Next, the connector 48 is installed in the female connector 6 by first pushing the first portion 30 of fiber holder 28 into the hole 9 of female connector 6, and then screwing the threaded hole portion 46 onto the female connector 6. Also, the connector 48 must be screwed on to insure that the front face of the connector shell 38 is tightly against the brass ring 16 of adaptor 50, for insuring good electrical conductivity therebetween. In this manner, an electrical circuit is established from the sense node 7 of controller 4, through female connector 6, through brass ring 16, through resistor 13, through brass ring 14, and through clip 10 to ground, thereby effective installing resistor chip 13 into the resistive voltage divider circuit of FIG. 1B, as previously described. Also as previously described, the result is that the optical laser transmitter system 2 is enabled to be selectively energized for transmitting laser beam into an optical fiber carried by the optical fiber cable 24.

A second embodiment of the invention includes a connector 70 as shown in FIGS. 5A through 5D. The connector 70 includes a housing or connector shell 72, which in the preferred embodiment consists of a single piece of plastic material, such as Delrin, or any other suitable plastic material including Teflon®, ABS polycarbonate, nylon, and so forth. Connector housing or shell 72 includes a back portion 74 having a relatively enlarged diameter, followed by a major housing portion 76 of relatively smaller diameter, as shown. The back portion 74 includes a centrally located through hole 78 terminating into a relatively larger inside diameter circular cavity 80 for retaining therein a spring 79 consisting of suitable electrically conductive material, and the optical fiber holder 28 with retainer tube 36. Note that the second portion 32, and centrally located enlarged outside diameter portion 33 are contained within the circular cavity 80, with the second portion 32 within spring 79. Note further that sufficient mechanical contact is maintained between the optical fiber holder 28 and the spring 79 to insure an electrically conductive circuit path is being established therebetween. The housing 72 further has its circular cavity 80 terminating into a relatively enlarged circular diameter front end cavity 82. Permanent magnet 84 has an outside diameter dimensioned to insure that it can be pressed fitted into the front end cavity 82 of housing 72. Alternatively, or in addition, the magnet 84 can be adhesively secured or glued into the circular cavity 82.

Assembly of connector 70 will now be described. An electrically conductive bare wire 86 has one end attached to the spring 79 by soldering or welding in a manner insuring electrical contact or conductivity therebetween. The spring 79 is then installed into cavity 80 of housing 72. Before installation of the magnet 84 into the housing 72, a free portion of the wire 86 is threaded out of the front 77 of the housing 72, followed by installation of magnet 84. Next, excess wire is cut flush with magnet 84 at the front end 77 of the housing 72. The optical fiber holder 28 is then installed in the housing 72, using a similar process as described above for male connector 48. The wire 86 provides an electrical connection from optical fiber holder 28, to spring 79, to wire 86, through to magnet 84. The magnet 84 includes a centrally located through hole 88, as shown in phantom in FIG. 5A. The first portion 30 of the optical fiber holder 28 protrudes out of the housing 72. Also, optical fiber retaining portion 30 of optical fiber holder 28 protrudes through and out of the central hole 88 of magnet 84 by a sufficient length to permit it to be installed into the through hole 9 of female connector 6, as will be described further below. Note further that the housing 72 includes a circular reduced diameter step down portion 90 around through hole 78 on the back face 92.

Figures 6A, 6B:
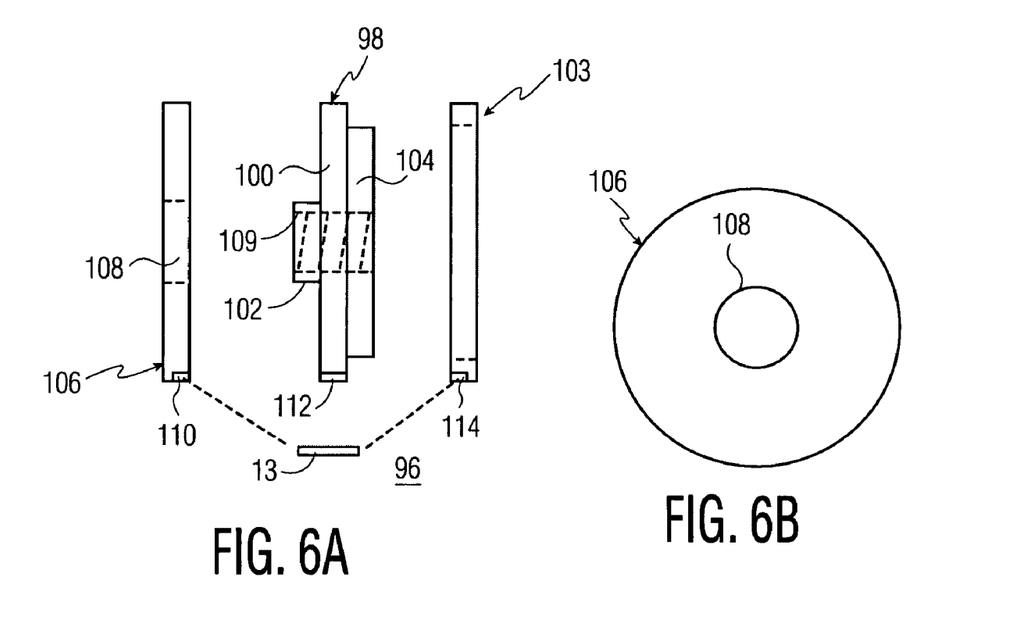
FIG. 6A is an exploded assembly diagram of an adaptor for another embodiment of the invention for use in association with the connector embodiment of FIG. 5A.
FIG. 6B is a front elevational view of a ring of ferromagnetic material for the adaptor of FIG. 6A, the back elevational view being identical thereto.
Figure 6C:
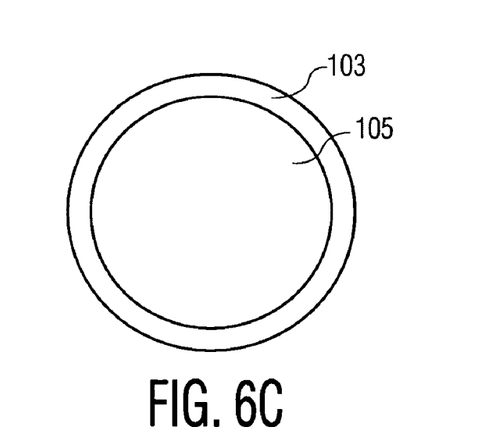
FIG. 6C is a back elevational view of an electrically conductive ring or washer for the embodiment of the invention of FIG. 6A, the front elevational view being identical thereto.
Figure 6D:
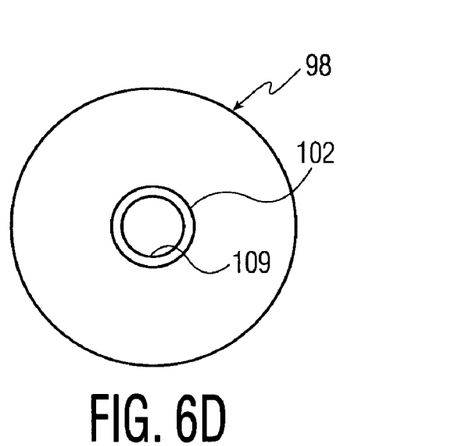
FIG. 6D is a front elevational view of an insulated ring or washer of the adaptor of FIG. 6A.
Figure 6E:
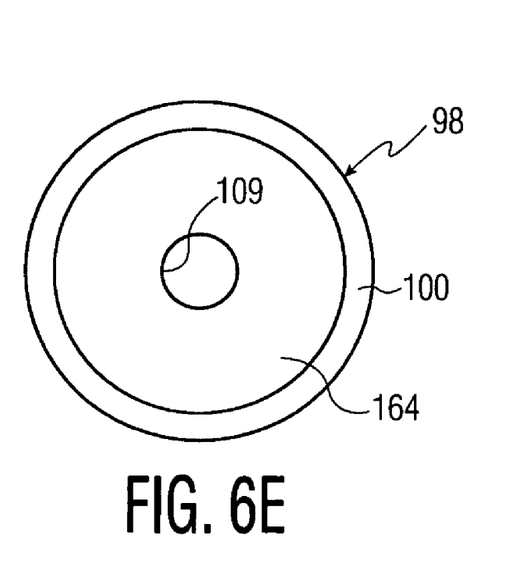
FIG. 6E is a back elevational view of the insulated ring or washer of the adaptor of FIG. 6A.
Figure 6F:
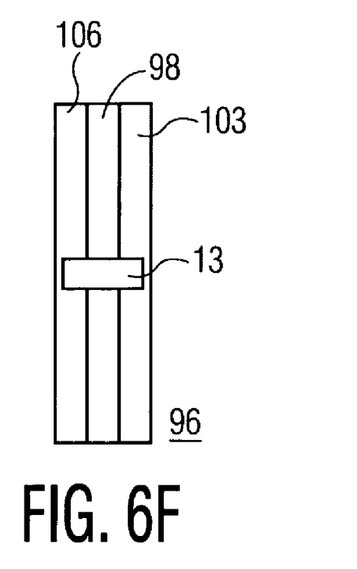
FIG. 6F is a side elevational view of the assembled adaptor of FIG. 6A.
Figure 6G:
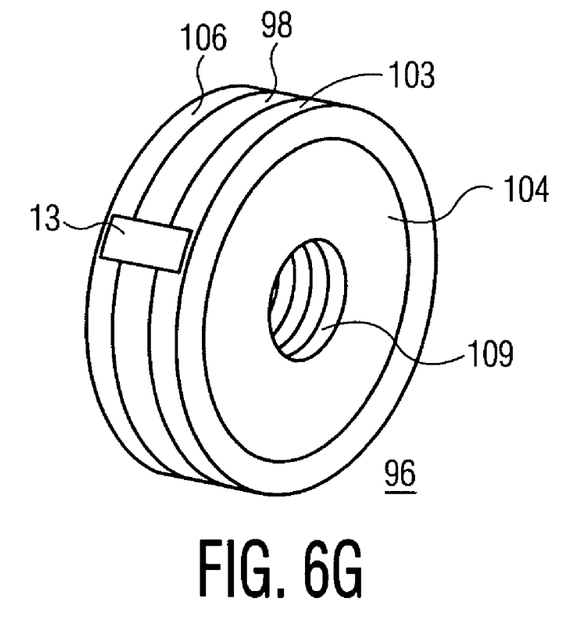
FIG. 6G is a pictorial view of the assembled adaptor of FIG. 6A.

An adaptor 96 for the second embodiment of the invention is shown in FIGS. 6A through 6G. As shown in FIG. 6A, an exploded assembly view, the insulated ring 98 preferably consisting of a single piece of plastic material as previously described for insulative ring 17, but has a different mechanical configuration from the latter. More specifically, the electrically insulative ring 98 includes a centrally located portion 100 of relatively large diameter, a centrally located circular mounting stud 102 of substantially smaller outside diameter than central portion 100, and on the opposite face of the central portion 100 a circular step-down portion 104 of slightly reduced outside diameter relative to central portion 100, as shown. An electrically conductive ring 103 is preferably made of brass material, but as previously described for similar components above, can otherwise consist of any suitable electrically conductive metal material. The brass ring 103, in this example, includes a centrally located open area 10S as shown in FIG. 6C, having a diameter dimensioned to permit the ring to be press fit onto portion 104 of insulator washer 98. The brass ring 103 can otherwise be adhesively secured or glued onto the insulator ring 98. A ring 106 consisting of a ferromagnetic material such as iron, 400 series stainless steel, or any other suitable ferromagnetic material, includes a centrally located hole 108 for mounting upon the circular protrusion or mounting stud 102 of insulator ring 98, and the two are adhesively or glued together. Note that a centrally located hole 109 is provided through insulative ring 98, that is completely through its mounting stud 102, central portion 100, and ring mount step 104, respectively. Note that the hole 109 through insulative ring 98 is threaded to provide for screw on mounting onto the female connector 6.

Operation of the second embodiment of the invention will now be described. First, the adaptor 96 is screwed onto the female connector 6 to insure that brass ring 103 is mechanically secured against the ground clip 10 for insuring a low resistance electrical contact therebetween. Next, the connector 70 is pushed onto the female connector 6 the first portion 30 of the optical fiber holder 28 being inserted into the central hole 9 of connector 6. Connector assembly 70 is then further pushed onto female connector 6 for insuring that its permanent magnet 84 is magnetically attached to the face of the ferromagnetic ring 106 of adaptor 96. Also, it is important to note that spring 79 serves to insure that the optical fiber holder 28 is extended the greatest amount possible from the front portion 77 of housing 72 to insure necessary centering and penetration of the fiber holding first portion 30 of fiber holder 28 into the central hole 9 of the female connector 6. As with previously described embodiments, this insures efficient transfer of laser light from the laser transmitter system 2 into the optical fiber (not shown). After the aforesaid installation of the adaptor 96 and the connector 70 onto the female connector 6, an electrical circuit path is provided from the sense node 7 through female electrical connector 6, through the optical fiber holder 28, through spring 79, through wire 86, through magnet 84, through ferromagnetic ring 106, through resistor 13, through brass ring 103, and through grounding clip 10 to ground. The aforesaid form a series electrical circuit path for inserting resistor chip 13 into the sensing circuit of FIG. 1B. As a result, as previously described, provided that resistor 13 has a predetermined acceptable, resistance value, optical laser transmittal system 2 can then be energized.

Figure 7A:
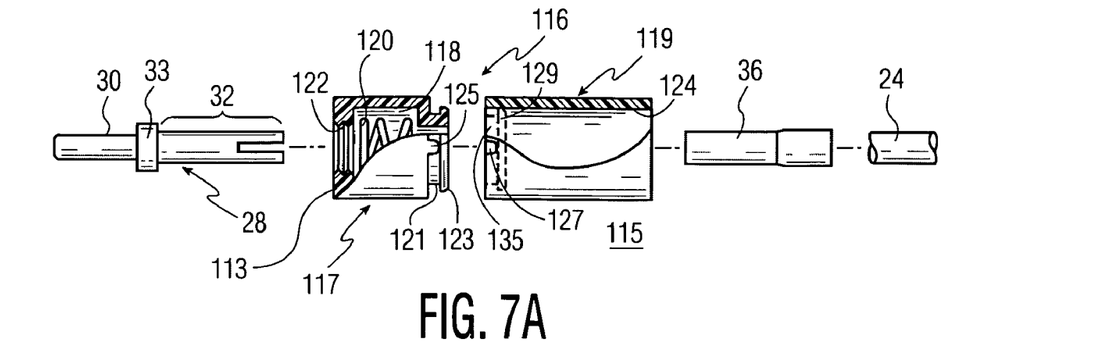
FIG. 7A is an exploded assembly view of a male fiber optic cable connector for another embodiment of the invention.
Figure 7B:
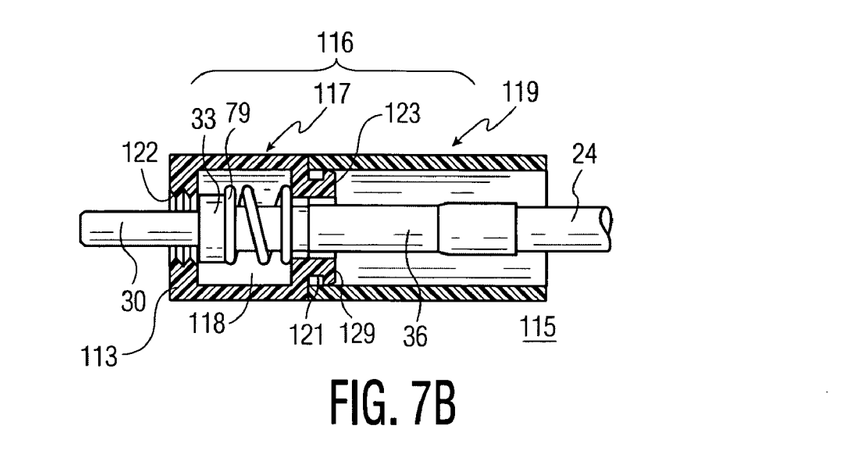
FIG. 7B is a cutaway view of the assembled connector of FIG. 7A.
Figure 7C:
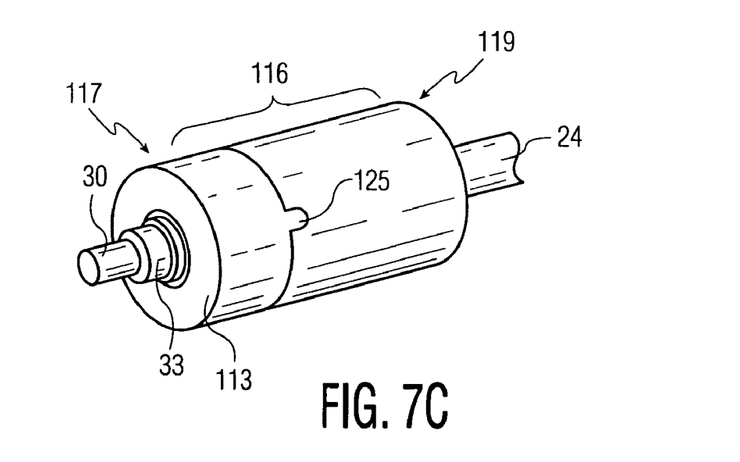
FIG. 7C is a pictorial view of the assembled connector of FIG. 7A.
Figure 8A:
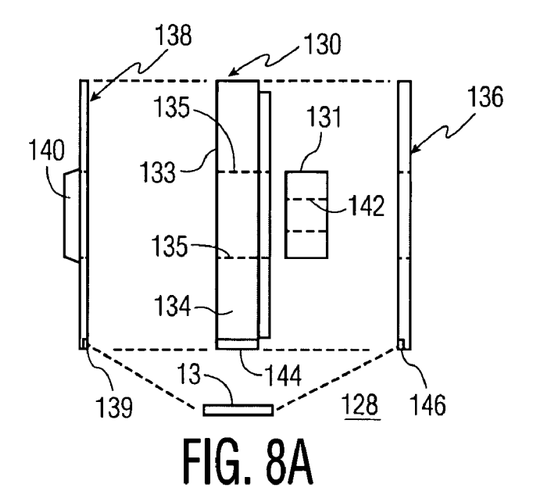
FIG. 8A is an exploded assembly diagram of an adaptor for another embodiment of the invention.
Figure 8B:
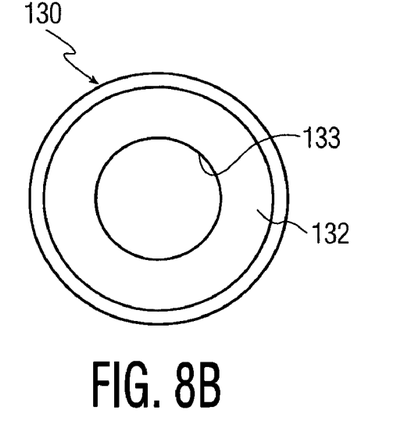
FIG. 8B is a back elevational view of an insulated ring or washer of the adaptor embodiment of FIG. 8A.
Figure 8C:
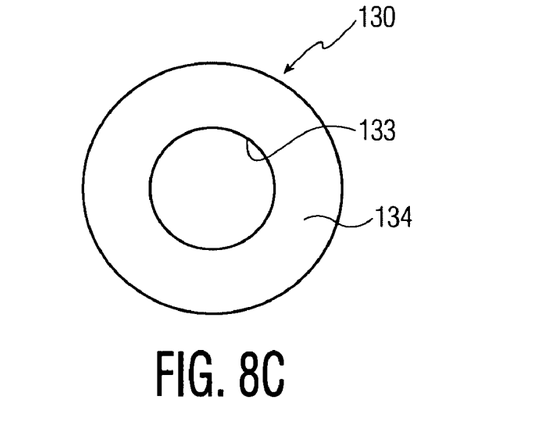
FIG. 8C is a front elevational view of the insulated ring or washer of 8B.
Figure 8D:
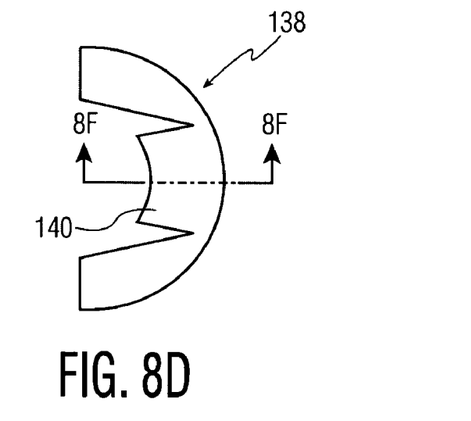
FIG. 8D is a front elevational view of a switch ring of the adaptor embodiment of FIG. 8A.
Figure 8E:
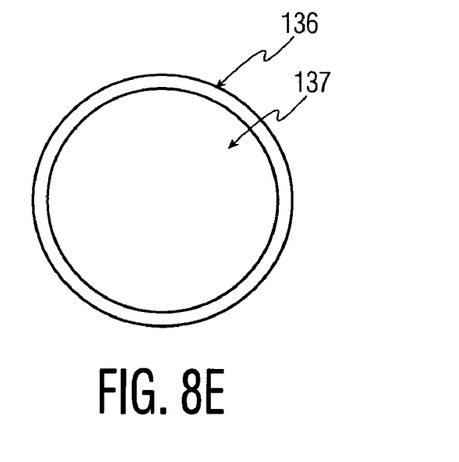
FIG. 8E is a back elevational view of an electrically conductive ring for the adaptor embodiment of the invention of FIG. 8A, the front elevational view being identical thereto.
Figure 8F:
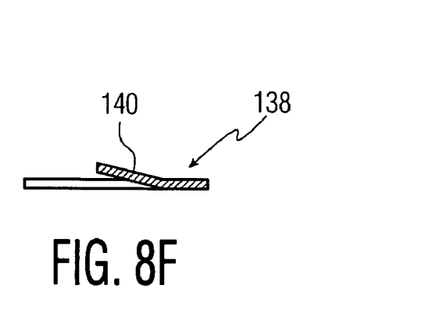
FIG. 8F is a cross-sectional view of the switch ring of 8D taken along 7F-7F.
Figure 8G:
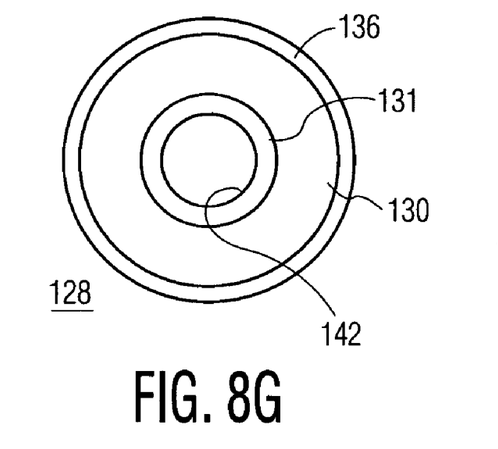
FIG. 8G is a front elevational view of the assembled adaptor of FIG. 8A.
Figure 8H:
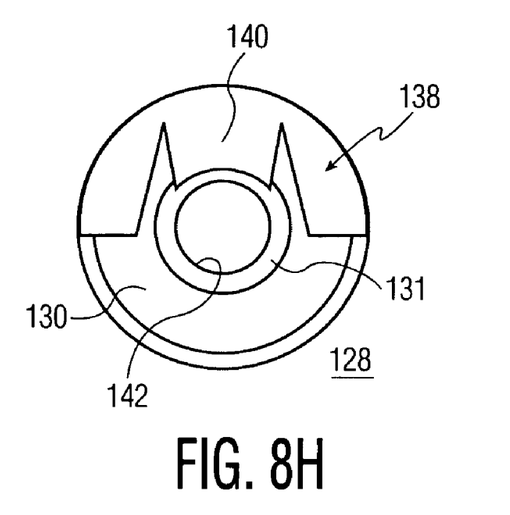
FIG. 8H is a back elevational view of the assembled adaptor of FIG. 8A.
Figure 8I:
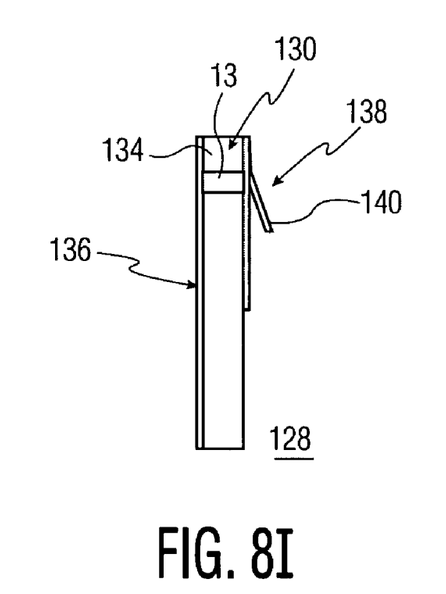
FIG. 8I is a side elevational view of the assembled adaptor of FIG. 8A.
Figure 8J:
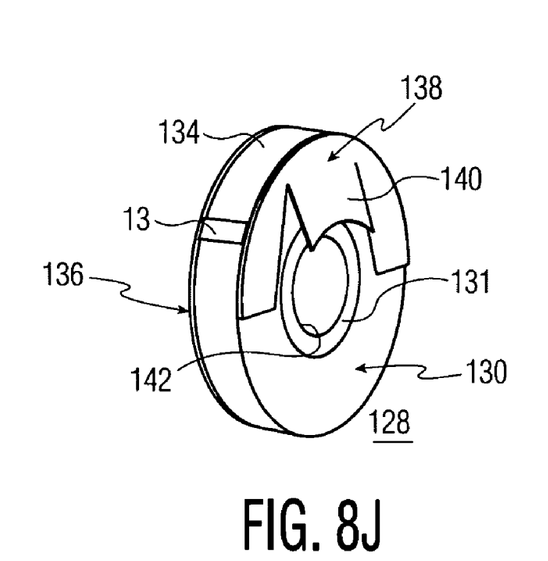
FIG. 8J is a pictorial view of the assembled adaptor of FIG. 8A.

A connector for a third embodiment of the invention is shown in FIGS. 7A through 7C. An elongated housing or shell 116 consists of any suitable plastic material, as previously described for other embodiments of the invention. The front portion of the housing 116 includes a circular cavity 118 for containing a spring 120 mounted over retainer tube 36 crimped onto portion 32 of optical fiber holder 28. Housing 116 is provided in two sections, a front or first section 117, and a back or second section 119, for ease of assembling connector 115, as will be described below. The first section 117 includes the circular cavity 118 that has a centrally located threaded through hole 122 opening from front face 113. The first section 117 also includes a reduced diameter extension 121 that terminates to a chamfered locking collar 123, for snapping into an interior circular locking groove 129 in the second section 119. When so joined, an antirotation tab 125 of section 117 is pushed into slot 127 of section 119. A hole 135 of the second section 119 is receptive of extension 121 and locking collar 123. As previously described, fiber optic cable 24 is securely retained within portion 32 of optical fiber holder 28 via the crimped on retainer tube 36, using a process similar to that for connector 48 (see above), except that the second section 119 is first pushed onto optical fiber cable 24. Next, the optical fiber cable 24 is pushed through the first section 117 as indicated, the optical fiber and cable 24 portion are secured in the optical fiber holder 28 as previously indicated. This step is followed by joining the first section 117 to the second section 119 to provide completed housing 116 with assembled connector 115. An optic fiber end portion (not shown) from optical cable 24 is enclosed within a central hole (not shown) of portion 30 of optical fiber holder 28, as previously described. The second section 119 also includes a hollow elongated circular cavity portion 124 that follows from the locking groove 129, as shown. A portion of the optical fiber cable 24 extending from optical fiber holder 28 is enclosed within elongated portion 124. Note that the elongated second section 119 is provided in the preferred embodiment to assist a user in screwing the connector 115 onto the female connector 6. However, in a less preferred embodiment, the housing 116 can be made substantially shorter than shown.

An adaptor 128 for the third embodiment of the invention is shown in FIGS. 8A through 8I. As shown in the exploded assembly view of FIG. 8A, the third embodiment adaptor 128 includes an electrically insulative washer or ring 130 consisting of a single piece of suitable plastic material, as previously described for other embodiments. A reduced diameter step down portion 132 relative to the main larger diameter portion 134 is dimensioned for centering, and receiving, preferably for press fit of a brass ring 136. An appropriate adhesive can also be used to rigidly secure ring 136 onto insulator ring 130. A small slot 144 is provided in the circumferential edge portions of insulator 130, for receiving a portion of resistor 13. A cutout or edge slot 146 is included in brass ring 136 for receiving one end of resistor 13. A relative small diameter brass ring 131, in this example, is rigidly press fitted into a hole 135 of insulator 130. A centrally located threaded hole 142 is included through ring 131 for screwing the adaptor 128 onto female connector 6. A switch plate or ring 138 consisting of electrically conductive material, preferably spring steel, is included in the configuration as shown in FIGS. 8A, 8D, 8F, 8H, and 8I, respectively. A spring tab 140 is provided on the semicircular bat-like configured switch plate or ring 138, as shown. The switch plate or ring 138 is rigidly secured via an appropriate adhesive to a back face 133 of insulator ring 130, as shown. The switch plate 138 includes a cutout or edge slot or notch 139 for receiving the other end of resistor 13.

Operation of the third embodiment of the invention will now be described. First, the adaptor 128 for the third embodiment of the invention is screwed via threaded hole 142 of ring 131 onto the female connector 6 with the switch plate or ring 138 facing outward. It must be insured that the brass ring 136 is screwed tightly against the ground clip 10. Next, the connector 115 is screwed onto the female connector 6 via its threaded hole 122, in a manner insuring that the first portion 30 of the optical fiber holder 28 first goes into the through hole 9 of female connector 6. Connector 115 must be screwed on in a manner forcing the front face 113 thereof against a tab 140 of switch plate or ring 138, forcing the tab 140 into mechanical and electrical contact with the conductive ring 131 in insulator ring 130. In this manner, a series electrical circuit is established between the sensing node 7 of the sensing circuit of FIG. 1B, female connector 6, electrically conductive ring 131, switch plate or ring 138, resistor 13, brass ring 132, and ground clip 10 to ground. Once this series circuit is established, the optical laser transmitter system 2 can then be energized as previously described, provided resistor 13 has a resistance value within an acceptable range.

Figure 9A:
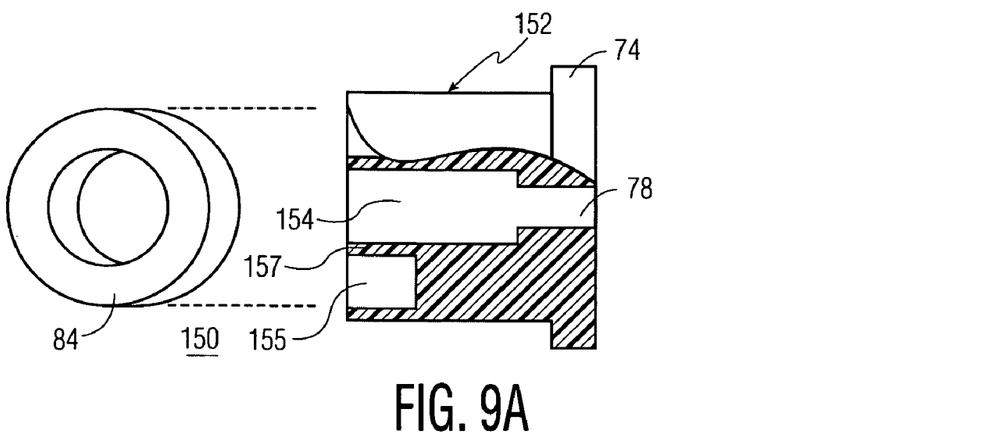
FIG. 9A is a partial assembly view of a male connector shell and magnet for an alternative embodiment for the embodiment of FIGS. 5A-5D.
Figure 9B:
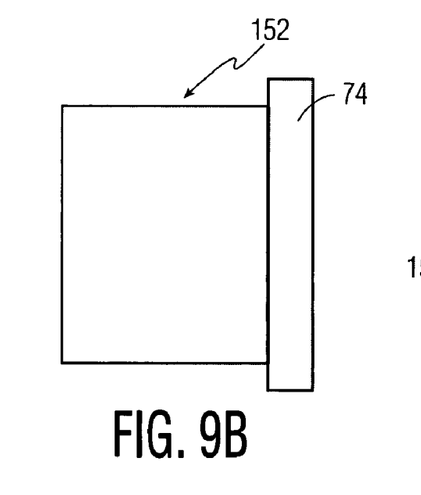
FIG. 9B is a side elevational view for the partially assembled connector of FIG. 9A.
Figure 9C:
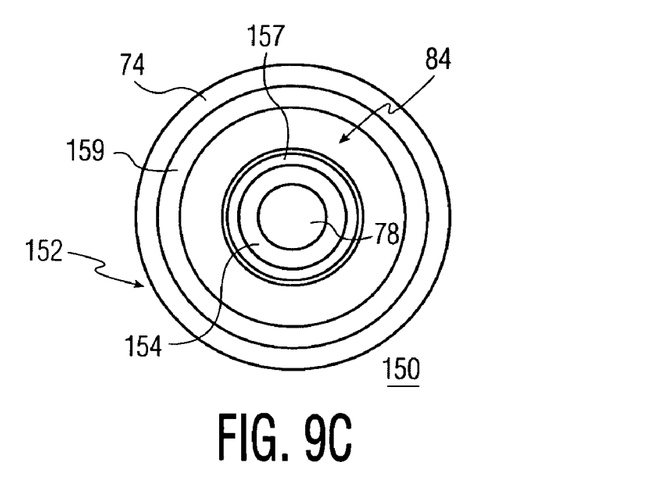
FIG. 9C is a front elevational view of the connector of FIG. 9A with the magnet installed.
Figure 9D:
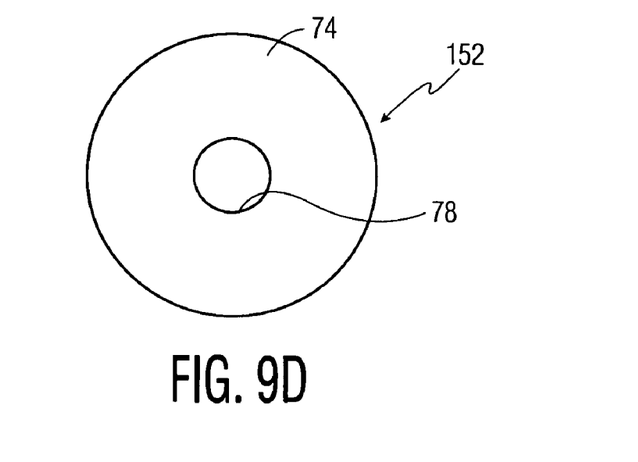
FIG. 9D is a back elevational view of the connector shell of FIG. 9A.
Figure 9E:
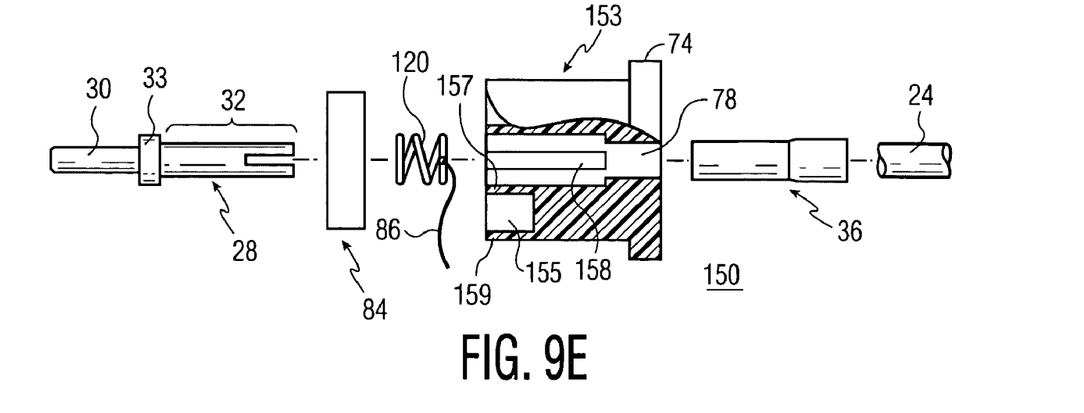
FIG. 9E is an exploded assembly view with a partial cutaway of a connector shell for the embodiment of FIG. 9A.
Figure 9F:
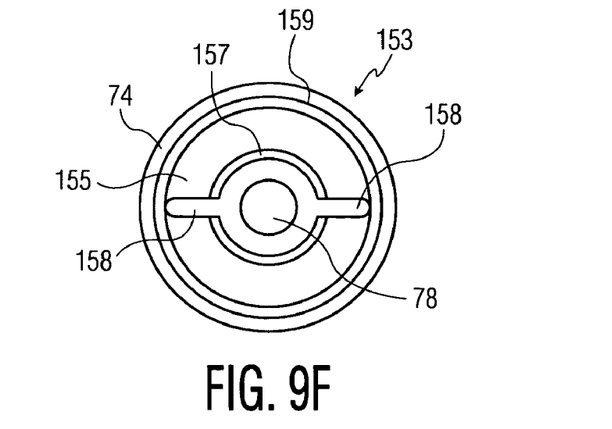
FIG. 9F is a front elevational view of the connector shell of FIGS. 9A and 9E.
Figure 9G:
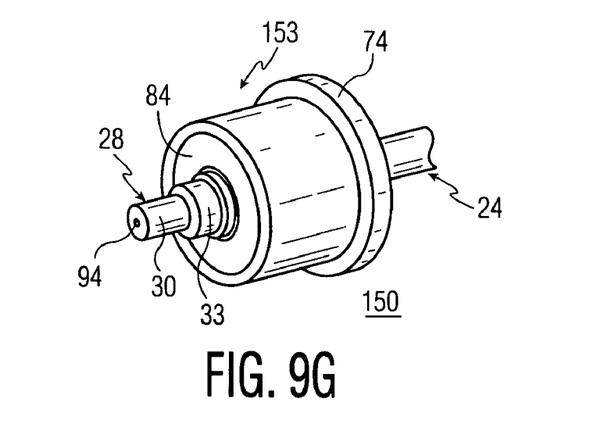
FIG. 9G is a pictorial view looking toward the front of the assembled embodiment of FIG. 9E.

An alternative embodiment for a connector assembly for use with the second embodiment adaptor 96 (FIGS. 6A-6G), as previously described, is shown in FIGS. 9A through 9G. More specifically, this embodiment includes a permanent magnet 84 for installation into an alternative housing or connector shell 152 that differs from the connector shell 72 of the second embodiment connector 70 (FIGS. 5A-5D). Cavity 154 extends completely through to the front end of housing 152. A circular channel 155 is cut into the front end of the housing 152, as shown, for receiving the permanent magnet 84, thereby providing better securement of the magnet via the circular channel 155 and inner circular wall 157. The circular channel also includes an outer wall 159. Cavity 154 is configured for receiving the spring 120, and an optical fiber holder 28 installed thereon to retain the optical fiber cable 24, as previously described for the connector 70. As shown in FIGS. 9E and 9F, the housing 153, in a preferred embodiment, relative to housing 152, further includes a pair of wire slots 158. An exploded assembly view is shown in FIGS. 9E and 9F for the alternative preferred connection embodiment 160. The assembly sequence for connector 150 (see FIG. 9E) is similar to the assembly of connectors 48 and 70 as given above, except that the wire 86 is positioned within a wire slot 158 before installing magnet 84.

A tool 62 for facilitating the installation of adaptor 50 (see FIGS. 4B and 4D) is shown in FIGS. 10A through 10C. Tool 62 includes spaced apart circular prongs or fingers 66 dimensioned to fit into tool holes 60 of adaptor 50, to permit a user to screw adaptor 50 onto the female connector 6 by turning tool handle 68. Also, tool 62 can be similarly used to remove adaptor 50 from female connector 6. The fingers 66 of tool 62 are part of a U-shaped end member 64, as shown. Note that holes 60 can also be provided in adaptors 96 and 128 in their back faces for permitting use of tool 62 to similarly facilitate installing these adaptors on female connector 6.

Although various embodiments of the invention have been shown and described, they are not meant to be limiting. Those of skill in the art may recognize certain modifications to these embodiments, which modifications are meant to be covered by the spirit and scope of the appended claim. For example, if at least the first section 117 of housing 116 consists of suitable electrically conductive material, housing 116 can be substituted for housing or shell 38 of the first embodiment of the invention. Also, although preferred materials are indicated for various components of the invention, such materials are not meant to be limiting, and other suitable materials can be substituted.

What is claimed is:

1. The combination of an adaptor and a male connector for both connecting a fiber optic cable to a female connector of an optical laser transmitter system, and for inserting a resistor having a value indicative of an acceptable fiber optic cable into a sensing circuit of a controller of the optical laser transmitter system, for causing the controller to respond by permitting activation of the optical laser transmitter system, and a ground clip means surrounding and electrically isolated from the female connector, said adaptor and male connector combination comprising:
   said adaptor being ring shaped, and including:
      a centrally located insulator ring formed from electrically insulative material, and having a centrally located threaded hole for screwing the adaptor onto the female connector;
      first electrically conductive means secured to a front face or end of said insulator ring;
      a second electrically conductive means secured to a back face or end of said insulator ring;
      said resistor being electrically connected between said first and second electrically conductive means;
   said female connector further including an outer threaded shell consisting of electrically conductive material, the shell having a cylindrical cavity for receiving an optical fiber(s), and the shell being electrically connected to a sense node of said sensing circuit;
   said male connector further including:
      a cylindrical housing or outer shell including a front face having a centrally located hole opening into a portion of a cavity extending through to a centrally located hole in a back face thereof; and
      an optical fiber holder secured within a cavity of said cylindrical housing, said holder including a front portion for retaining an optical fiber(s), said front portion protruding outward from the front face of said housing, and a back portion for retaining an optical fiber cable containing said optical fiber(s), the front portion being configured for snugly fitting into the cavity of said female connector;
   whereby said adaptor is screwed onto said female connector with its associated first electrically conductive means tightened against said ground clip means, for grounding one end of said resistor, whereafter said male connector is secured onto said female connector with its front face tightly against said second electrically conductive means of said adaptor; and
   third electrically conductive means, responsive to the front face of said connector being secured against said second electrically conductive means, when said connector is mounted on said female connector, for electrically connecting another end of said resistor through said female connector to the sense node of said sensing circuit.

2. The combination of claim 1, further including:
   said centrally located hole on the front face of said connector being threaded for screwing onto said female connector;
   said second electrically conductive means being a ring of electrically conductive material having an outside diameter substantially the same as that of said insulator ring, and an inside diameter that is substantially greater than that of the threaded hole of said insulator ring; and
   said third electrically conductive means consisting of said male connector housing having at least its front face being formed by electrically conductive material.

3. The combination of claim 1, further including:
   said centrally located hole on the front face of said connector being threaded for screwing onto said female connector;
   said second electrically conductive means being a ring of electrically conductive material having an outside diameter substantially the same as that of said insulator ring, and an inside diameter that is substantially greater than that of the threaded hole of said insulator ring; and said third electrically conductive means being provided by said male connector consisting entirely of electrically conductive material.

4. The combination of claim 1, wherein said male connector further includes:

a spring secured over said optical fiber holder within said cylindrical housing for maintaining proper alignment of said front portion of said optical fiber holder within the cylindrical cavity of said female connector.

5. The combination of claim 3, further including:

said first electrically conductive means being a ring of electrically conductive material having an outside diameter substantially the same as that of said insulator ring, and an inside diameter that is substantially greater than that of the threaded hole of said insulator ring.

6. The combination of claim 4, further including:

a ring shaped permanent magnet;

said male connector further including:

a circular recess in the front face for rigidly securing said magnet with a portion of said magnet extending outward therefrom;

a wire of electricity conductive material having one end rigidly secured to said spring, said spring consisting of electrically conductive material, the other end portion of said wire being retained between an edge of said magnet and an inside wall of said circular recess in a manner insuring an electrical connection between the magnet and wire, and spring;

said adaptor further including:

said second electrically conductive means consisting of ferromagnetic material having a ring shape; and said third electrically conductive means consisting of said connector being mounted on said female connector with its said magnet clamped to said ferromagnetic ring of said adaptor, thereby establishing a series electrical circuit including the another end of said resistor, said ferromagnetic ring, said magnet, said wire, said spring, said optical fiber holder, and said female connector.

7. The combination of claim 6, wherein said recess in the front face of said male connector is the form of a circular groove for enclosing substantial portions of inside and outside diameter walls of said magnet.

8. The combination of claim 1, further including:

the centrally located hole on the front face of the housing of said male connector being threaded for screwing onto said female connector;

said adaptor further including:

said second electrically conductive means consisting of a switch plate with a spring biased outwardly protruding tab from said back face of said insulator ring;

said third electrically conductive means consisting of a reduced diameter ring of electrically conductive material relative to said insulator ring, said reduced diameter ring having a centrally located threaded hole, and being mounted within a centrally located hole through said insulator ring, said threaded hole of said reduced diameter ring providing the centrally located threaded hole for said insulator ring, said switch plate being electrically isolated from said reduced diameter ring, with said tab overlying a portion of said reduced diameter ring, whereby when said male connector is screwed onto said female connector tightly against said switch plate, said tab thereof is forced into contact with said reduced diameter ring for completing a series connected electrical path including the another end of said resistor, said switch plate, said reduced diameter ring, and said female connector.

9. The combination of claim 1, further including:

a hollow cylindrical extension including a front end having means for rigidly coupling to said back face of said cylindrical housing; and the back face of said cylindrical housing including a reduced diameter outwardly projecting portion configured for snapping into, and rigidly connecting to said coupling means of said extension.

10. The combination of claim 2 further including:

a hollow cylindrical extension including a front end having means for rigidly coupling to said back face of said cylindrical housing; and the back face of said cylindrical housing including a reduced diameter outwardly projecting portion configured for snapping into, and rigidly connecting to said coupling means of said extension.

11. The combination of claim 3, further including:

a hollow cylindrical extension including a front end having means for rigidly coupling to said back face of said cylindrical housing; and the back face of said cylindrical housing including a reduced diameter outwardly projecting portion configured for snapping into, and rigidly connecting to said coupling means of said extension.

12. The combination of claim 5, wherein said adaptor further includes:

said insulator ring having step down diameter circular portions on its front and back faces, respectively, for receiving and centering said rings of electrically conductive material providing said first and second electrically conductive means, respectively.

13. The combination of claim 12, further including:

said insulator ring having a transverse groove in its edge for receiving said resistor; and each of said rings of electrically conductive material having slots in respective inner circumferential edges for receiving individual respective ends of said resistor.

14. The combination of claim 6, further including:

said insulator ring of said adaptor having a central projecting hub from its back face for receiving a centrally located hole in said ferromagnetic ring, for centering the latter on the back face; and said first electrically conductive means being a ring of electrically conductive material having an outside diameter substantially the same as that of said insulator ring, and an inside diameter that is substantially greater than that of the threaded hole of said insulator ring; and said insulator ring having a reduced diameter portion projecting from its front face for receiving and centering the electrically conductive ring providing said first electrically conductive means.

15. The combination of claim 14, further including:

said insulator ring having a transverse groove in its edge for receiving said resistor; and said ferromagnetic ring and said electrically conductive ring each having slots in respective inner circumferential edges for receiving individual respective ends of said resistor.

16. The combination of claim 8, wherein said switch plate includes:

a single piece of electrically conductive spring material having a semicircular portion for mounting on the back face of said insulator ring, and being positioned for mechanically and electrically contacting an end of said resistor;

said spring material being further configured to have a central portion of said semicircular portion cutout to provide said tab bent away from and overlying said reduced diameter ring.

17. The combination of claim 16, wherein said switch plate consists of spring steel material.

18. The combination of claim 1, further including:

said first electrically conductive means being a ring of electrically conductive material having an outside diameter substantially the same as that of said insulator ring, and an inside diameter that is substantially greater than that of the threaded hole of said insulator ring;

said centrally located hole on the front face of said connector being threaded for screwing onto said female connector; and said second electrically conductive means being a ring of electrically conductive material having an outside diameter substantially the same as that of said insulator ring, and an inside diameter that is substantially greater than that of the threaded hole of said insulator ring.

19. The combination of claim 18, wherein each of said rings of electrically conductive material consists of electrically conductive material consist of brass material.

20. The combination of claim 6, wherein said first electrically conductive means consists of a ring of electrically conductive material having an outside diameter substantially the same as that of said insulator ring, and an inside diameter that is substantially greater than that of the threaded hole of said insulator ring.

21. The combination of claim 20, wherein said ring of electrically conductive material consists of brass material.

* * * * *